(12) United States Patent
Reiss et al.

(10) Patent No.: US 12,576,691 B2
(45) Date of Patent: Mar. 17, 2026

(54) METHOD FOR MONITORING AN AIR-CONDITIONED PASSENGER COMPARTMENT OF A VEHICLE, AND AIR-CONDITIONING ARRANGEMENT FOR CARRYING OUT SUCH A METHOD

(71) Applicant: Siemens Mobility GmbH, Munich (DE)

(72) Inventors: Gerhard Reiss, Krefeld (DE);
Alexander Hildebrandt, Bochum (DE)

(73) Assignee: Siemens Mobility GmbH, Munich (DE)

( * ) Notice: Subject to any disclaimer, the term of this patent is extended or adjusted under 35 U.S.C. 154(b) by 69 days.

(21) Appl. No.: 18/689,521

(22) PCT Filed: Aug. 5, 2022

(86) PCT No.: PCT/EP2022/072125
§ 371 (c)(1),
(2) Date: Mar. 6, 2024

(87) PCT Pub. No.: WO2023/030831
PCT Pub. Date: Mar. 9, 2023

(65) Prior Publication Data
US 2024/0343090 A1     Oct. 17, 2024

(30) Foreign Application Priority Data
Sep. 6, 2021     (DE) ..................... 10 2021 209 793.6

(51) Int. Cl.
*B60H 1/00*     (2006.01)
(52) U.S. Cl.
CPC ..... *B60H 1/00807* (2013.01); *B60H 1/00371* (2013.01)

(58) Field of Classification Search
CPC ........... B60H 1/00807; B60H 1/00371; B61D 27/0018
See application file for complete search history.

(56) References Cited

U.S. PATENT DOCUMENTS 8,892,277 B2 * 11/2014 Shiota ................ B61D 27/0072
                                                                701/19
9,533,550 B2 * 1/2017 Kitamura ........... G05D 23/1927
(Continued)

FOREIGN PATENT DOCUMENTS

EP          2457797 A1      5/2012
JP       2010266318 A     11/2010
(Continued)

OTHER PUBLICATIONS

Schminder Jörg et al: "A generic simulation model for prediction of thermal conditions and human performance in cockpits", Building and Environment, Pergamon Press, Oxford, GB, Bd. 143, Jul. 5, 2018 (Jul. 5, 2018), pp. 120-129, XP085461621, ISSN: 0360-1323, DOI: 10.1016/J.BUILDENV.2018.06.055 the whole document; 2018.

*Primary Examiner* — Masud Ahmed
(74) *Attorney, Agent, or Firm* — Laurence A. Greenberg; Werner H. Stemer; Ralph E. Locher

(57) ABSTRACT

A method monitors a passenger compartment of a vehicle for transporting passengers with respect to heat stress that occurs to passengers. The method includes the steps of: a) calculating an estimated value for the WBGT index in the passenger compartment on the basis of measured values which are signaled to an evaluation unit by a sensor arrangement, and b) signaling a dangerous heat stress level for the passengers on the basis of calculations and monitoring of the WBGT index.

13 Claims, 3 Drawing Sheets

(56)        References Cited

U.S. PATENT DOCUMENTS

| | | | | |
|---|---|---|---|---|
| 10,675,939 | B2 * | 6/2020 | Ahuja ................ | G05B 13/0265 |
| 10,983,542 | B2 * | 4/2021 | Sun .................... | G05D 23/1927 |
| 2004/0152408 | A1 * | 8/2004 | Eckhardt ........... | B60H 1/00742 |
| | | | | 454/99 |

FOREIGN PATENT DOCUMENTS

| | | | |
|---|---|---|---|
| JP | 2013130384 A | 7/2013 |
| JP | 2015133050 A | 7/2015 |
| JP | 2018160136 A | 10/2018 |
| JP | 2020016528 A | 1/2020 |

* cited by examiner

METHOD FOR MONITORING AN AIR-CONDITIONED PASSENGER COMPARTMENT OF A VEHICLE, AND AIR-CONDITIONING ARRANGEMENT FOR CARRYING OUT SUCH A METHOD

FIELD AND BACKGROUND OF THE INVENTION

The invention relates to a method for monitoring a passenger compartment of a vehicle for transporting passengers with respect to a heat stress occurring for passengers, and to an air conditioning arrangement for carrying out such a method.

In vehicles for passenger transport, such as buses or rail vehicles, significant heat stresses for passengers can occur. This can be relevant in particular when an outside temperature and/or sunlight levels are very high, the vehicles are very heavily occupied with passengers, or if a provided air conditioning arrangement can no longer provide its full cooling capacity, has failed or is not designed for a temporary extreme case. In many cases, a combination of the above causes can result in unacceptable heat stress for the passengers.

The term "heat stress" in the present description refers to inadequate heat dissipation in the human body. This can be the case in particular when high air temperatures in the passenger compartment impede convective heat dissipation, high air humidity makes evaporative cooling more difficult and the presence of direct or indirect sunlight additionally warms the body.

To assess the heat stress on individuals, it is known to refer to the "Wet Bulb Globe Temperature" (WBGT), also called the WBGT Index. This index summarizes the following measurement variables: natural wet bulb temperature $T_{nw}$ (equivalent to "cooling limit temperature"), dry bulb temperature $T_g$ and air temperature $T_a$.

The WBGT index is calculated according to ISO 7243 from these measurement variables as follows:

In sunlight: $WBGT = 0.7\, T_{nw} + 0.2\, T_g + 0.1\, T_a$     (1)

or without sunlight: $WBGT = 0.7\, T_{nw} + 0.3\, T_g$.     (2)

A known instrumentation for determining the wet bulb temperature that defines the assessment of the heat stress comprises a thermometer inserted in a moist/wet wick (natural wet bulb temperature $T_{nw}$), a thermometer at the center of a thin, dry bulb with a diameter of 150 mm (dry bulb temperature $T_g$), and a thermometer which is largely protected from radiation (air temperature $T_a$). Such instrumentation is practically impossible to accommodate in the passenger compartments of vehicles. If the various thermometers were freely accessible, the instrumentation would also be at risk of vandalism. An arrangement of the instrumentation behind panels or above an interior ceiling would not cover all influencing factors, such as humidity, sunlight and room temperature.

SUMMARY OF THE INVENTION

Based on this, the object of the invention is to further develop a method of the aforementioned type in such a manner that reliable values for the wet bulb temperature can be determined, and to provide an air-conditioning arrangement with which the aforementioned method can be carried out.

With respect to the method, this object is achieved by a method having the features of the independent method claim.

Accordingly, a method for monitoring a passenger compartment of a vehicle for transporting passengers with respect to heat stress occurring to passengers comprises the following steps:

a) calculating an estimated value for the WBGT index in the passenger compartment on the basis of measured values, which are signaled to an evaluation unit by a sensor arrangement, and b) signaling a dangerous heat stress for the passengers on the basis of calculation and monitoring of the WBGT index.

Thus, to calculate a value for the WBGT index, measured values are used which are acquired by means of the sensor arrangement. Typically, passenger compartments of vehicles, in particular rail vehicles, are equipped with a plurality of temperature sensors for the passenger compartment and additional humidity sensors. The measured values supplied by these sensors must be suitably processed so that an estimated value for the WBGT index can be calculated. For example, once a threshold value for the WBGT index which reflects a dangerous heat stress for the passengers is exceeded, this finding is signaled to the passengers and/or an operator of the vehicle so that the necessary steps can be taken. This could be, for example, arranging an immediate evacuation of the vehicle.

The value for the WBGT index is preferably calculated according to the formula $WBGT = 0.7\, T_{nw} + 0.2\, T_g + 0.1\, T_a$.

$T_{nw}$ is a natural wet bulb temperature, $T_g$ is a dry bulb temperature and $T_a$ is an air temperature in the passenger compartment.

Without solar radiation, the dry bulb temperature $T_g$ will be approximately equal to the air temperature $T_a$. Then, the equation $WBGT = 0.7\, T_{nw} + 0.3\, T_g$ is also satisfied.

An estimated value of the natural wet bulb temperature $T_{nw}$ can be calculated in different ways. Preferred alternatives are given in the dependent claims. In all alternatives, provision must be made for the sensor arrangement to have the individual sensors required for the respective measurement, in particular temperature and humidity sensors. The sensors are either already present on vehicles due to the original design of the air-conditioning arrangement of the vehicle, or they must be retrofitted.

An estimated value of the dry bulb temperature $T_g$ is preferably determined by a maximum value of air temperatures measured by a plurality of temperature sensors arranged in the passenger compartment. To increase the accuracy for the estimated value of the dry bulb temperature $T_g$, it is advantageous if a plurality of temperature sensors is arranged on both longitudinal sides of the passenger compartment. The maximum value obtained from all measured values can then be used as an estimate of the dry bulb temperature $T_g$ to calculate the wet bulb temperature WBGT. Alternatively, if the number of temperature sensors on each longitudinal side of the vehicle is at least two, it is also possible to use an average of, for example, the two highest values measured by the temperature sensors provided for the passenger compartment in order to calculate the dry bulb temperature $T_g$.

An estimated value of the air temperature $T_a$ can preferably be determined from an average value of the air temperatures measured by the temperature sensors arranged in the passenger compartment. In this case, the average value of all temperature measurements, which are acquired by the temperature sensors provided in the passenger compartment, is advantageously determined.

The evaluation unit used in step a) can be integrated, for example, in a train control device or an air-conditioning unit controller. It is also possible that the evaluation unit provided is connected downstream of a separate measured value acquisition device. This evaluation unit then also triggers the signaling provided in step b) of a dangerous heat stress due to, for example, a threshold value for the wet bulb temperature WBGT being exceeded, or signals the given detection to another entity of the vehicle, which in turn performs the signaling process in step b).

While the above-mentioned threshold value for the WBGT index is used to signal short-term exposure to heat stress and triggers the measure(s) to request that passengers leave the vehicle as soon as possible and/or to alert a vehicle operator to the presence of the heat stress, it is also possible to signal heat stresses to be expected in the medium term.

For this purpose, it can be provided that additionally in step b), an exceedance duration D for the threshold value of the WBGT index is summed over a sliding time window of defined length and the exceeding of a predetermined threshold value is signaled for the exceedance duration. It is also possible, for example, that two or more threshold values are defined for the duration of the exceeding of the threshold value for the wet bulb temperature. Each of these threshold values for the exceedance duration may then be assigned a time interval within which measures will be taken to protect passengers from heat stress. For example, a lower threshold may be provided for the duration of the exceedance at which responses should occur within, for example, one hour, and a higher threshold at which responses should be made within, for example, 15 minutes. The possible measures/responses are the same as those taken when the threshold value for the WBGT index is exceeded even in the case of extremely short-term heat stresses, namely requesting passengers to leave the vehicle and/or informing the vehicle driver about the imminent heat stress.

The above-mentioned measured values of the sensors used depending on the particular embodiment of the method are preferably acquired and monitored/evaluated continuously.

The above-mentioned object is achieved with regard to the air conditioning arrangement by an air conditioning arrangement as claimed in the independent air conditioning configuration claim. According to this, the air conditioning arrangement comprises a sensor arrangement and an evaluation unit for measurement signals supplied by the sensor arrangement and is designed in such a way that a method of the type explained above can be carried out. In particular, the sensor arrangement comprises any temperature or humidity sensors that are required to implement the respective method variant.

The sensor arrangement preferably comprises sensors for a temperature in the passenger compartment, which are distributed over both longitudinal sides of the passenger compartment, at least one sensor for a temperature of recirculated air and/or exhaust air, and at least one sensor for the relative humidity of recirculated air and/or exhaust air and/or in the passenger compartment.

It goes without saying that only sensors determined by the particular measurement variables to be acquired are required to implement a specific method variant, as described above.

The arrangement of the temperature sensors in the passenger compartment over both longitudinal sides of the passenger compartment has the advantage that a local temperature distribution in the passenger compartment can be detected with high accuracy, which ensures a high quality of the respective estimated values for the natural wet bulb temperature $T_{nw}$, the dry bulb temperature $T_g$ and, if applicable, namely if the solar radiation for the vehicle is detected, the air temperature $T_a$ in the passenger compartment.

Exemplary embodiments of the invention are described in the following with reference to the drawings. In the drawings:

DETAILED DESCRIPTION OF THE INVENTION

Figure 1:
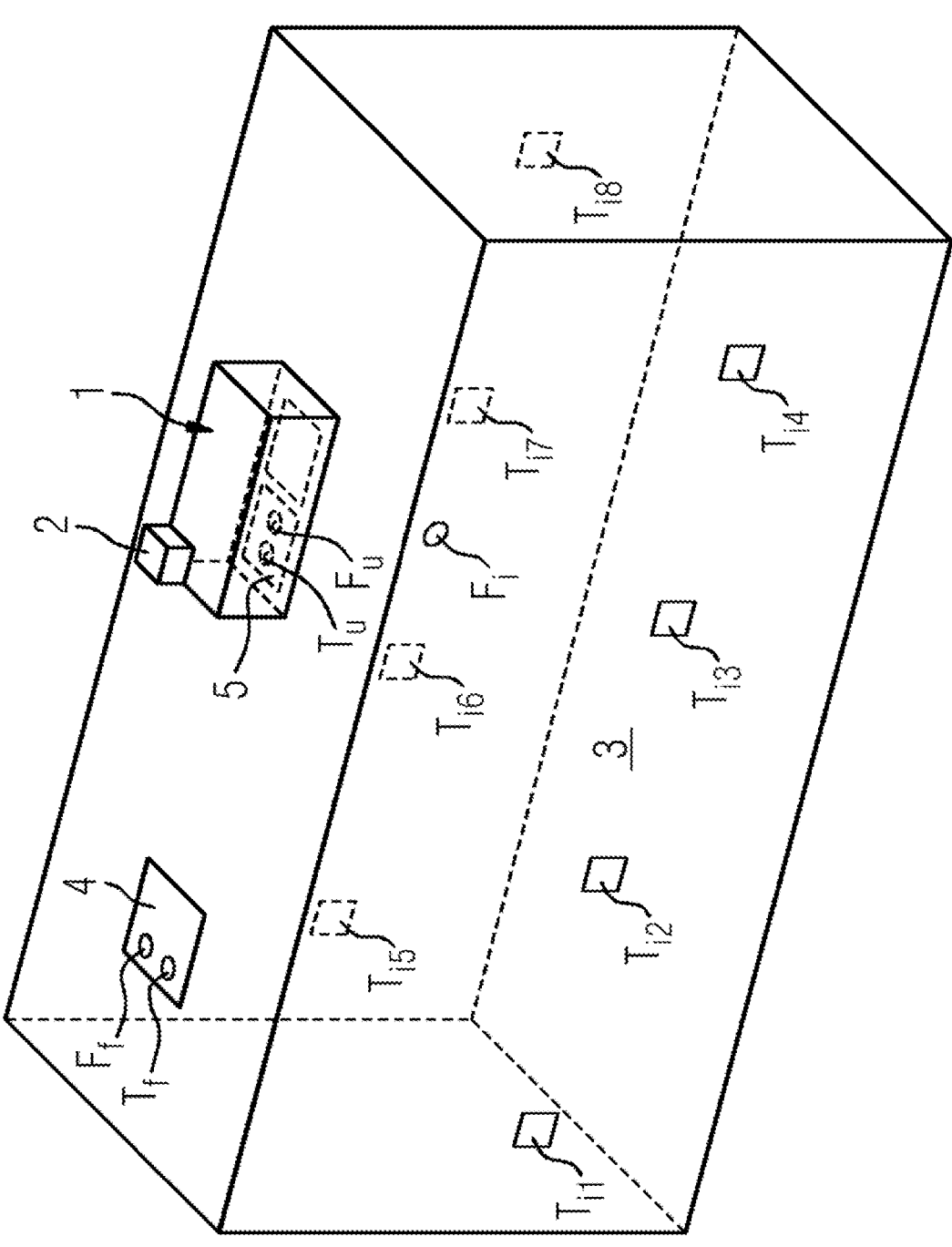
FIG. 1 shows a perspective, schematic view of a rail vehicle car.

The exemplary embodiment according to FIG. 1 shows an air conditioning arrangement with an air conditioning unit 1, a sensor arrangement and an air conditioning unit controller, which contains an integrated evaluation unit 2 for measurement signals supplied by the sensor arrangement.

The sensor arrangement in the present exemplary embodiment comprises four temperature sensors $T_{i1}, \ldots, T_{i8}$, distributed in each case in the longitudinal direction of the vehicle, and a humidity sensor F, on each of the two longitudinal sides of a passenger compartment 3 of a vehicle, which here, for example, is an individual car of a rail vehicle. The temperature sensors $T_{i1}, \ldots, T_{i8}$ and the humidity sensor $F_1$ supply measurement signals for a respective temperature or air humidity in the passenger compartment 3. These measurement signals are transmitted to the evaluation unit 2. In addition, the sensor arrangement at an exhaust air outlet 4 of the air conditioning arrangement comprises a temperature sensor $T_f$ and a humidity sensor $F_f$. A recirculating air outlet 5 leading from the passenger compartment 3 to the air conditioning unit 1 is also equipped with a temperature sensor $T_u$ and a humidity sensor $F_u$. Measurement signals from the temperature sensors $T_f$, $T_u$ and the humidity sensors $F_f$, $F_u$ are also directed to the evaluation unit 2.

To estimate the extent to which passengers present in the passenger compartment 3 are exposed to heat stress, the evaluation unit 2 calculates an estimated value for a wet bulb temperature WBGT based on the measured values obtained from the sensor arrangement, according to the following equation:

$$WBGT = 0.7\, T_{nw} + 0.2\, T_g + 0.1\, T_a. \qquad (1)$$

The calculation of a measured value for the WBGT index is based on estimated values of the natural wet bulb temperature $T_{nw}$, the dry bulb temperature $T_g$ and, when using equation (1), the (average) room temperature $T_a$.

Different variants are possible for estimating the natural wet bulb temperature $T_{nw}$. Specifically, the estimated value for the natural wet bulb temperature $T_{nw}$ can be determined according to the following variant methods:

a) the averaged measurement signals of the temperature sensors $T_{i1}, \ldots, T_{i8}$ in the passenger compartment 3 and the measurement signal of the humidity sensor $F_u$ for the recirculated air, b) the averaged measurement signals of the temperature sensors $T_{i1}, \ldots, T_{i8}$ in the passenger compartment 3 and the measurement signal of the humidity sensor $F_f$ for the exhaust air, c) the measurement signal of the temperature sensor $T_u$ for the recirculated air and the measurement signal of the humidity sensor $F_u$ for the recirculated air, d) the measurement signal of the temperature sensor $T_f$ for the exhaust air and the measurement signal of the humidity sensor $F_f$ for the exhaust air, e) the measurement signal of the temperature sensor $T_u$ for the recirculated air and the measurement signal of the humidity sensor $F_f$ for the exhaust air, f) the measurement signal of the temperature sensor $T_f$ for the exhaust air and the measurement signal of the humidity sensor $F_u$ for the recirculated air or g) the measurement signal pairs of the temperature sensors $T_{i1}, \ldots, T_{i8}$ in the passenger compartment 3 and the humidity sensor $F_i$ in the passenger compartment.

Figure 4:
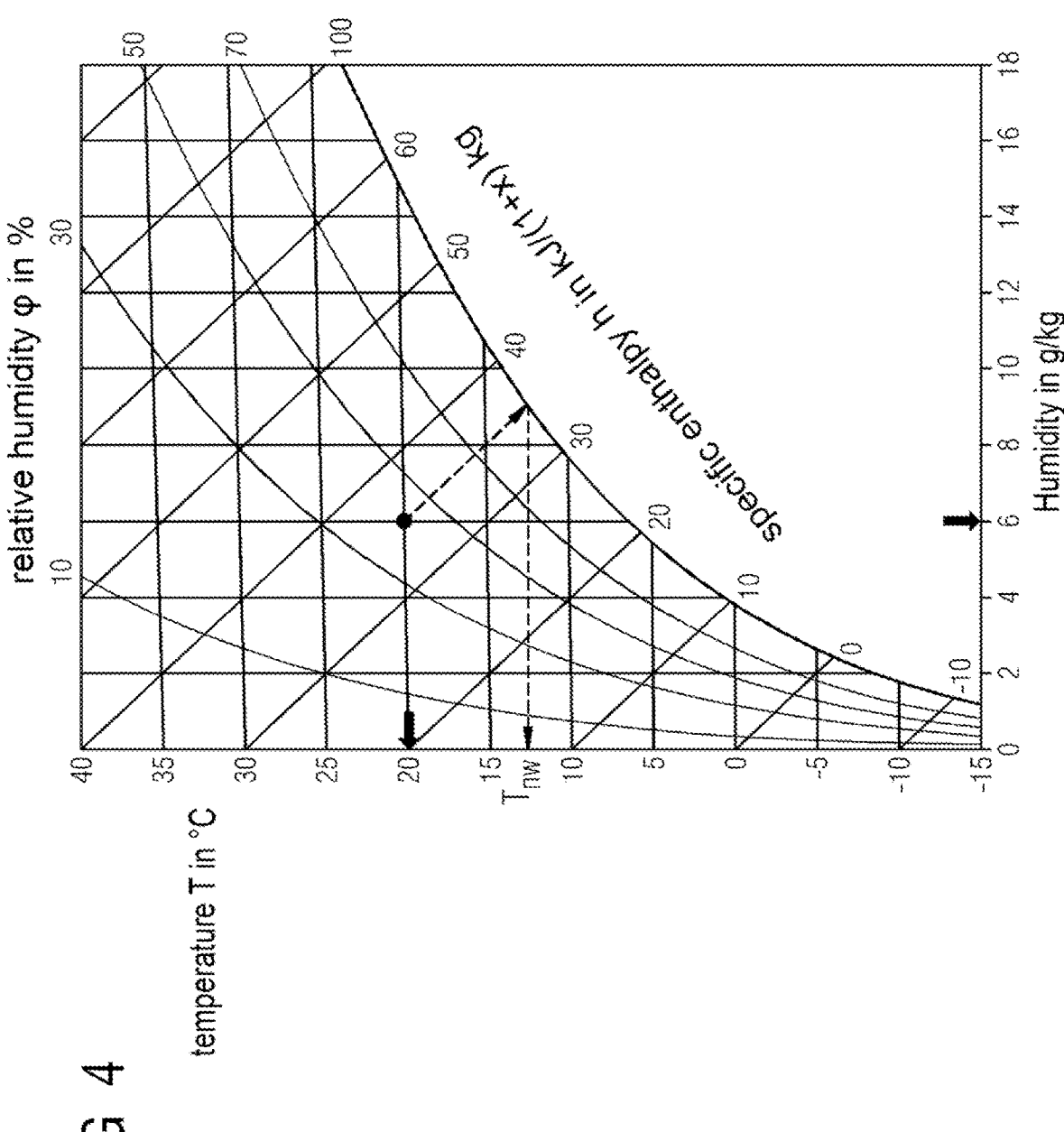
FIG. 4 shows a graphical representation of the temperature as a function of the humidity for determining the natural wet bulb temperature $T_{nw}$.

The value for the natural wet bulb temperature $T_{nw}$ is then determined, for example, based on the graphical representation of FIG. 4, namely with the respectively determined values for the temperature T and the humidity x (water content). In the value pair example illustrated, the temperature T is 20° C. and the humidity x is 6 g/kg. Implementing these values in the graphical representation results in a natural wet bulb temperature $T_{nw}$ of approximately 13° C.

For the dry bulb temperature $T_g$, an estimated value is also used for insertion into one of the two equations (1) and (2) above. This is determined from a maximum temperature value detected by the temperature sensors $T_{i1}, \ldots, T_{i8}$ for the passenger compartment 3. If at least two temperature sensors $T_{i1}, \ldots, T_{i8}$ are used on each longitudinal side of the vehicle for passenger compartment 3, the two largest measured values for the temperature in the passenger compartment can also be used as a temperature value for the dry bulb temperature $T_g$.

The average temperature of the temperature values measured by the temperature sensors $T_{i1}, \ldots, T_{i8}$ for the passenger compartment 3 is used as the air temperature $T_a$.

If necessary, the evaluation device 2 signals a dangerous/excessive heat stress for the passengers present in the passenger compartment 3. This can be carried out, for example, by means of visual or acoustic information outputs in the passenger compartment 3. Alternatively or in addition, a signal can also be sent to an operator of the vehicle in question.

A calculation algorithm for the WBGT index is stored in the evaluation unit 2 to determine whether there is excessive heat stress on the passengers. To observe potentially occurring medium-term heat stresses, the following procedure is used: for monitoring the wet bulb temperature, a length for a sliding time window is defined, wherein the time window can be up to an hour in length, for example. In particular, the length of the time window can be 0.5 hours.

Figure 2:
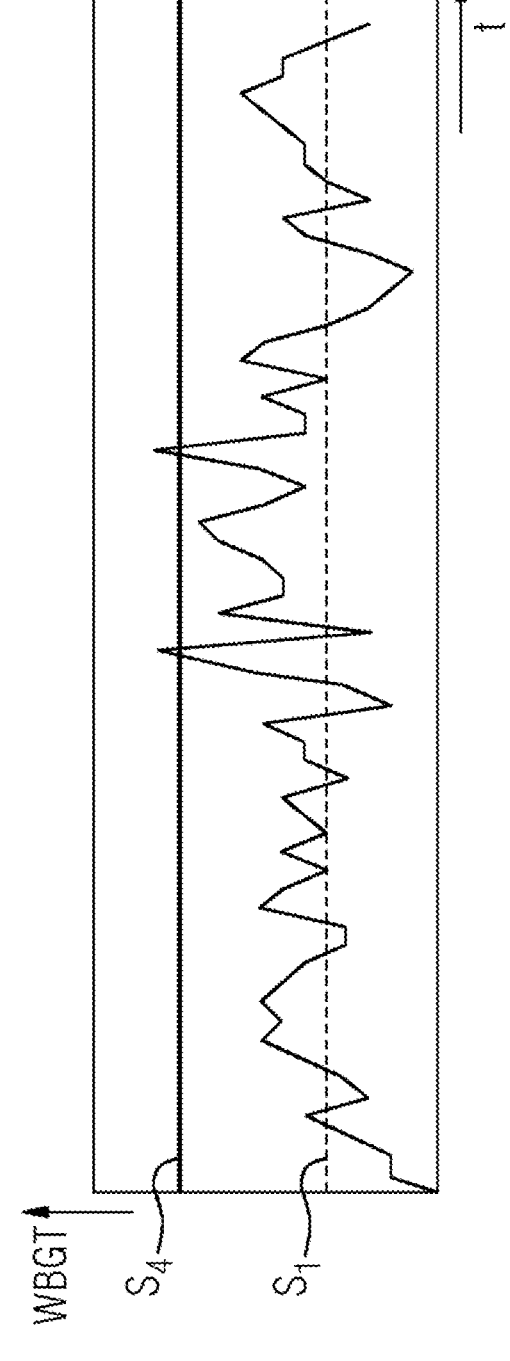
FIG. 2 shows a schematic, graphical representation of a temporal profile of the WBGT index in the passenger compartment of the vehicle.
Figure 3:
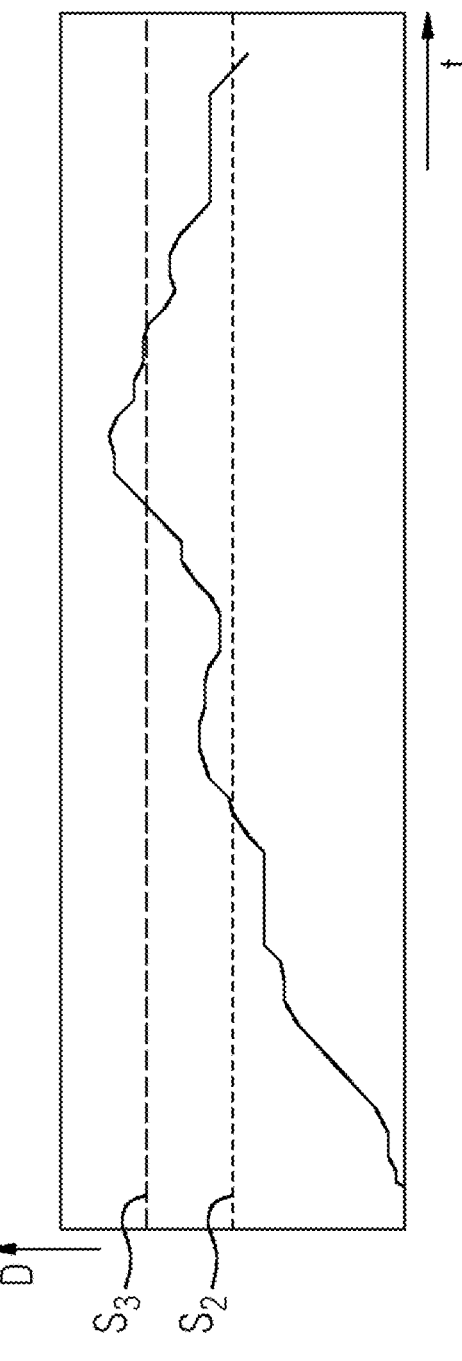
FIG. 3 shows a schematic, graphical representation of a temporal profile for an exceedance duration of the WBGT index in the passenger compartment of the vehicle

If the continuously calculated estimated value for the WBGT index reaches or exceeds a threshold value $S_1$, see FIG. 2, then an exceedance duration D in the previously defined time window is summed. In the present exemplary embodiment, see FIG. 3, two threshold values $S_2$ and $S_3$ for the duration of exceeding the threshold value $S_1$ are defined for the WBGT index in the sliding time window:

The lower threshold value $S_2$ is defined as the time unit or quotient of the time window length, upon reaching which the passengers in the passenger compartment 3 are requested to leave the rail vehicle in the medium term, for example within one hour, and/or an operator of the vehicle is informed of heat stresses to be expected in the medium term. The higher threshold value $S_3$ is defined as the time unit or quotient of the time window length, upon reaching which the passengers in the passenger compartment 3 are requested to leave the rail vehicle within a short time, for example within 15 minutes, and/or the operator of the vehicle is informed of heat stresses to be expected within a short time.

To warn of short-term heat stresses such as these, so that immediate action is required, the following procedure is used: a further threshold value $S_4$ for the WBGT index is defined, above which the passengers in the passenger compartment 3 are requested to leave the rail vehicle as soon as possible and/or an operator of the rail vehicle is informed of the anticipated, immediate expected heat stress, requiring immediate measures.

It is clear that the further threshold value $S_4$ for the WBGT index is considerably higher than the threshold value $S_1$ for the WBGT index, which forms the basis for the monitoring of medium-term heat stress in the passenger compartment.

The invention claimed is:

1. A method for monitoring a passenger compartment of a passenger transport vehicle, being air-conditioned by means of an air-conditioning unit, with respect to heat stress occurring to passengers, the method comprises the steps of:

a) calculating an estimated value for a wet bulb globe temperature (WBGT) index in the passenger compartment on a basis of measured values, being signaled to an evaluation unit by a sensor configuration, the calculating of the estimated value for the WBGT index being performed:

according to the formula: WBGT=0.7 $T_{nw}$+0.2 $T_g$+0.1 $T_a$; or according to the formula WBGT=0.7 $T_{nw}$+0.3 $T_g$;

where $T_{nw}$ is a natural wet bulb temperature, $T_g$ is a dry bulb temperature and $T_a$ is an air temperature in the passenger compartment; and b) signaling a dangerous heat stress level for the passengers on a basis of a calculation and monitoring of the WBGT index.

2. The method according to claim 1, which further comprises calculating an estimated value of the natural wet bulb temperature $T_{nw}$ from locally averaged measurement signals for a temperature in the passenger compartment and from a measurement signal for a relative humidity of circulating air or exhaust air.

3. The method according to claim 1, which further comprises calculating an estimated value of the natural wet bulb temperature $T_{nw}$ from a measurement signal for a temperature of circulating air and a measurement signal for a relative humidity of the circulating air or exhaust air.

4. The method according to claim 1, which further comprises calculating an estimated value of the natural wet bulb temperature $T_{nw}$ from a measurement signal for a temperature of exhaust air and a measurement signal for a relative humidity of the exhaust air or circulating air.

5. The method according to claim 1 which further comprises calculating an estimated value of the natural wet bulb temperature $T_{nw}$ from measurement signal pairs for a temperature in the passenger compartment and a relative humidity in the passenger compartment.

6. The method according to claim 1, which further comprises determining an estimated value of the dry bulb temperature $T_g$ from a maximum value of air temperatures measured by a plurality of temperature sensors disposed in the passenger compartment.

7. The method according to claim 1, which further comprises determining an estimated value of the air temperature $T_a$ from an average of air temperatures measured by temperature sensors disposed in the passenger compartment.

8. The method according to claim 1, which further comprises integrating the evaluation unit into a train control device or an air-conditioning unit controller or is connected downstream of a separate measurement acquisition device.

9. The method according to claim 1, wherein in step b), exceeding of a threshold value for the WBGT index is signaled to passengers present in the passenger compartment via a passenger information system.

10. The method according to claim 1, wherein in step b), exceeding of a threshold value for the WBGT index is signaled to an operator of the vehicle.

11. The method according to claim 1, wherein in step b), an exceedance duration for a threshold value of the WBGT index is summed over a sliding time window of defined length and an exceedance of a predetermined threshold value is signaled for the exceedance duration.

12. An air-conditioning configuration, comprising:

a sensor configuration; and an evaluation unit receiving measurement signals supplied by said sensor configuration, the air-conditioning configuration is configured to carry out the method according to claim 1.

13. The air-conditioning configuration according to claim 12, wherein:

said sensor configuration contains sensors for measuring a temperature in the passenger compartment, said sensors are distributed over both longitudinal sides of the passenger compartment, at least one of said sensors measures a temperature of recirculated air and/or of exhaust air and at least another one of said sensors measures a relative humidity of recirculated air and/or exhaust air and/or in the passenger compartment.

\* \* \* \* \*